Patented July 21, 1953

2,646,437

UNITED STATES PATENT OFFICE 2,646,437

PROCESS FOR PREPARING ISOPROPENYL ESTERS

Joseph B. Dickey and Theodore E. Stanin, Rochester, N. Y., assignors to Eastman Kodak Company, Rochester, N. Y., a corporation of New Jersey No Drawing. Application March 23, 1950, Serial No. 151,544

6 Claims. (Cl. 260—410.9)

This invention relates to a process for preparing isopropenyl esters of carboxylic acids containing at least three carbon atoms.

It is known that in the presence of a suitable catalyst an organic ester can be converted by acidolysis to the ester of another and different carboxylic acid. For example, W. O. Herrmann, United States Patent 2,079,068, dated May 4, 1937, prepared vinyl formate by reacting vinyl acetate with formic acid, in the presence of a mercury salt such as mercuric oxide or mercuric acetate and a strong mineral acid such as sulfuric or phosphoric acid. It was also proposed by W. O. Herrmann, United States Patent 2,245,131, dated June 10, 1941, to prepare vinyl benzoate by reacting vinyl acetate with benzoic acid, in the presence of mercuric acetate and sulfuric acid, and in like manner to prepare vinyl crotonate from vinyl acetate and crotonic acid. A generally similar process of ester interchange was also proposed by W. J. Toussaint in United States Patent 2,299,862, dated October 27, 1942. In contrast, isopropenyl acetate on treatment with formic acid, in the presence of a mercury salt and a strong mineral acid, does not give any isopropenyl formate. Under similar conditions, isopropenyl acetate with chloroacetic acid also fails to give any isopropenyl chloroacetate.

More recently, B. Phillips, Jr., United States Patent 2,466,738, dated April 12, 1949, has proposed preparing enol esters by reacting a lower enol ester such as isopropenyl acetate with the anhydride of the carboxylic acid of the ester to be produced, in the presence of a strong acid such as sulfuric acid, p-toluene sulfonic acid, etc. A mixed anhydride was obtained as a by-product.

We have now found that isopropenyl esters of carboxylic acids containing three or more carbon atoms can be prepared by reacting isopropenyl acetate with the simple monocarboxylic acids containing three or more carbon atoms, in the presence of a suitable ester interchange catalyst such as a mercury salt, boron trifluoride etherate, etc., and in the presence of a strong mineral acid. The new process provides a more convenient and economical way of making enol esters of greater ester group chain length from isopropenyl acetate, the reaction products comprising an easily separated mixture of the desired enol ester, acetic acid and unreacted portions of the original reactants. Advantageously, the reaction can be carried out at relatively low temperatures and at normal atmospheric pressures.

It is, accordingly, an object of the invention to provide a new and convenient process for preparing enol esters wherein the ester group contains three or more carbon atoms. Other objects will become apparent hereinafter.

In accordance with the invention, isopropenyl esters having the general formula:

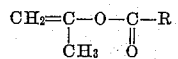

wherein R represents an alkyl group of the series $C_nH_{2n+1}$ wherein $n$ represents a positive integer of from 2 to 17, a 1-propenyl group, an oleyl group, a phenyl group, a furyl group, a tetrahydrofurfuryl group or a naphthenyl group, can be prepared by reacting isopropenyl acetate with a carboxylic acid such as a saturated fatty acid containing from 2 to 18 carbon atoms, crotonic acid, oleic acid, benzoic acid, furoic acid, tetrahydrofuroic acid and naphthenic acid, in the presence of a metal salt such as mercury salt (e. g., mercuric oxide, mercuric acetate, mercuric propionate, etc.), boron trifluoride and boron trifluoride etherates (e. g. boron trifluoride ethyl etherate, boron trifluoride methyl etherate, etc.), and in the presence of a strong acid which is capable of forming a salt with the mercury compound such as a strong mineral acid (e. g., sulfuric acid or phosphoric acid) or a sulfonic acid of the benzene series (e. g., benzene sulfonic acid, p-toluene sulfonic acid, methane sulfonic acid, ethane sulfonic acid, etc.), and separating the isopropenyl ester which is formed by fractional distillation of the reaction mixture. Advantageously, the reaction mixture is neutralized with an alkaline compound (e. g. sodium bicarbonate, sodium acetate, sodium carbonate, sodium hydroxide, potassium bicarbonate, potassium acetate, etc.), prior to fractionating the mixture. The temperature of the reaction can be varied widely from 20° to 100° C., but the best yields are obtainable at the lower temperatures; for example, at 20° to 60° C. In general, the reaction is carried out with from 1 to 4 mol weights of the isopropenyl acetate to each mol weight of the carboxylic acid to be reacted therewith, but the most advantageous ratio is 2 mol weights of isopropenyl acetate to each mol weight of the carboxylic acid. The metal salt employed as a catalyst can vary quite widely satisfactory results being obtained with concentrations of from 0.5 to 2 parts by weight of the metal salt to each 100 parts by weight of the reactants. The strong acid is advantageously added to the reaction mixture in amount sufficient to react with all of the metal salt, but the acid may be added, if desired, in excess over that needed to react with the salt.

The following examples will serve further to illustrate the process of our invention for preparing higher isopropenyl esters.

*Example 1.—Isopropenyl propionate*

100 g. (1 mol) of isopropenyl acetate, 38 g. (0.5 mol) of propionic acid, 1 g. of mercuric acetate and 0.275 g. of sulfuric acid (sp. g. 1.84) were mixed together and heated on a steam bath (85° to 100° C.) for 1.5 hours. The mixture was then filtered and washed with sodium carbonate solution (cold saturated) to remove acids. The resulting product was fractionally distilled under atmospheric pressure. The isopropenyl propionate obtained boiled at 112° C. to 114° C. at 750 mm. of mercury pressure. It had an index of refraction (25/D) of 1.3990.

*Example 2.—Isopropenyl n-butyrate*

(a) 100 g. (1 mol) of isopropenyl acetate, 44 g. (0.5 mol) of n-butyric acid, 1 g. of mercuric oxide and 0.275 g. of sulfuric acid (sp. g. 1.84) were mixed together. The mixture was heated on a steam bath for a period of 1.5 hours. The mixture was then filtered and washed with sodium bicarbonate solution (cold saturated) to remove acids. The resulting product was fractionally distilled under atmospheric pressure. The isopropenyl-n-butyrate boiled at 131° to 133° C. at 750 mm. of mercury pressure. It had an index of refraction (26/D) of 1.4078. The product is a colorless mobile liquid with a pleasant odor.

(b) 200 g. (2 mols) of isopropenyl acetate, 88 g. (1 mol) of n-butyric acid, 2 g. of mercuric acetate and 1 cc. of boron trifluoride ethyl etherate were mixed together and allowed to stand at 20° to 25° C. for a period of 24 hours. There was then added to the mixture 2 g. of anhydrous sodium acetate, the mixture filtered and then distilled. 42 g. of isopropenyl-n-butyrate, B. P. 133° C. at 740 mm. of mercury, refractive index (20/D) 1.4144, was obtained.

*Example 3.—Isopropenyl n-caproate*

100 g. (1 mol) of isopropenyl acetate, 58 g. (0.5 mol) of n-caproic acid, 1 g. of mercuric acetate and 0.5 cc. of sulfuric acid (sp. g. 1.84) were mixed together and heated on a steam bath (85° to 100° C.) with stirring for a period of two hours. The mixture was then filtered, washed with water and fractionally distilled. The isopropenyl caproate obtained boiled at 109° to 111° C. at 90 mm. of mercury. It was a clear liquid with an ethereal odor and refractive index (26/D) of 1.4173.

*Example 4.—Isopropenyl crotonate*

400 g. (4 mols) of isopropenyl acetate, 172 g. (2 mols) of crotonic acid, 2 g. of mercuric oxide and 2 cc. of sulfuric acid (sp. g. 1.84) were mixed together and stirred for a period of 20 hours at 20° C. to 25° C. The catalyst was then neutralized by adding 5 g. of sodium acetate to the mixture. After stirring the mixture for two hours, it was filtered and flash distilled at 30 mm. of mercury pressure. 2 g. of copper acetate were added and the flashed product fractionated. There were obtained 81 g. of isopropenyl crotonate boiling at 136° to 137° C. at 738 mm. of mercury pressure.

Other isopropenyl esters can be prepared by proceeding as described in the preceding examples. Thus, isopropenyl acetate with the other mentioned monocarboxylic acids at a temperature of from 20° to 100° C., in the presence of, for example, mercuric acetate and sulfuric acid gives the corresponding isopropenyl esters in operable yields. For example, isopropenyl acetate with lauric acid gives isopropenyl laurate, isopropenyl acetate with oleic acid at 85° to 100° C. gives isopropenyl oleate, isopropenyl acetate with stearic acid at 85° to 100° C. gives isopropenyl stearate, isopropenyl acetate with benzoic acid gives isopropenyl benzoate, isopropenyl acetate with furoic acid gives isopropenyl furoate, isopropenyl acetate with naphthenic acid gives isopropenyl naphthenate, etc.

What we claim is:

1. A process for preparing isopropenyl propionate comprising reacting isopropenyl acetate with propionic acid, at a temperature of from 85° to 100° C., in the presence of mercuric acetate and sulfuric acid, and separating the isopropenyl propionate which forms.

2. A process for preparing isopropenyl n-caproate comprising reacting isopropenyl acetate with n-caproic acid, at a temperature of from 85° to 100° C., in the presence of mercuric acetate and sulfuric acid, and separating the isopropenyl n-caproate which forms.

3. A process for preparing isopropenyl crotonate comprising reacting isopropenyl acetate with crotonic acid, at a temperature of from 20° to 25° C., in the presence of mercuric oxide and sulfuric acid, and separating the isopropenyl crotonate which forms.

4. A process for preparing isopropenyl oleate comprising reacting isopropenyl acetate with oleic acid, at a temperature of from 85° to 100° C., in the presence of mercuric acetate and sulfuric acid, and separating the isopropenyl oleate which forms.

5. A process for preparing isopropenyl esters from fatty monocarboxylic acids containing from 3 to 18 carbon atoms comprising reacting isopropenyl acetate with the said carboxylic acid, at a temperature of from 20° to 100° C., in the presence of a mercury compound selected from the group consisting of mercuric oxide and a mercuric salt of a saturated fatty acid and in the presence of a mineral acid selected from the group consisting of sulfuric acid and phosphoric acid, and separating the isopropenyl ester which forms.

6. A process for preparing isopropenyl-n-butyrate comprising reacting isopropenyl acetate with n-butyric acid, at a temperature of from 85° to 100° C., in the presence of mercuric oxide and sulfuric acid, and separating the isopropenyl n-butyrate which forms.

JOSEPH B. DICKEY.
THEODORE E. STANIN.

References Cited in the file of this patent

UNITED STATES PATENTS

| Number | Name | Date |
|---|---|---|
| 2,079,068 | Herrmann | May 4, 1937 |
| 2,245,131 | Herrmann et al. | June 10, 1941 |
| 2,299,862 | Toussaint et al. | Oct. 27, 1942 |
| 2,466,738 | Phillips | Apr. 12, 1949 |

OTHER REFERENCES

Karrer: "Organic Chemistry" (Elseirer Publ. Co., New York; 1946), second English edition; page 82.